(12) United States Patent
Kelliher et al.

(10) Patent No.: US 7,720,013 B1
(45) Date of Patent: May 18, 2010

(54) METHOD AND SYSTEM FOR CLASSIFYING DIGITAL TRAFFIC

(75) Inventors: Margaret Kelliher, Scotia, NY (US); Stephen Bush, Latham, NY (US); John Hershey, Ballston Lake, NY (US); Scott Evans, Burnt Hills, NY (US); Todd Hughes, Moorestown, NJ (US); Timothy Patrick Kelliher, Scotia, NY (US); Nathan Smith, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1291 days.

(21) Appl. No.: 10/963,142

(22) Filed: Oct. 12, 2004

(51) Int. Cl.
*H04L 12/16* (2006.01)
(52) U.S. Cl. .................. 370/265; 370/210; 370/202; 370/332
(58) Field of Classification Search ........... 370/210, 370/252, 253, 202, 332, 265; 375/240; 382/240
See application file for complete search history.

(56) References Cited

U.S. PATENT DOCUMENTS

| | | | | |
|---|---|---|---|---|
| 5,481,614 A * | 1/1996 | Johnston | | 381/2 |
| 5,491,564 A * | 2/1996 | Hongu | | 382/238 |
| 5,608,396 A * | 3/1997 | Cheng et al. | | 341/50 |
| 5,649,052 A * | 7/1997 | Kim | | 704/226 |
| 5,890,107 A * | 3/1999 | Shibuya | | 704/205 |
| 6,151,554 A * | 11/2000 | Rodney | | 702/9 |
| 6,161,088 A * | 12/2000 | Li et al. | | 704/229 |
| 6,173,384 B1 * | 1/2001 | Weaver | | 711/216 |
| 6,212,301 B1 * | 4/2001 | Warner et al. | | 382/232 |
| 6,281,816 B1 * | 8/2001 | Kampf | | 341/87 |
| 6,339,614 B1 * | 1/2002 | Gupta | | 375/240.01 |
| 6,400,310 B1 * | 6/2002 | Byrnes et al. | | 342/115 |
| 6,546,143 B1 * | 4/2003 | Taubman et al. | | 382/240 |
| 6,564,176 B2 * | 5/2003 | Kremliovsky et al. | | 702/189 |
| 6,597,660 B1 | 7/2003 | Rueda et al. | | 370/230.1 |
| 6,624,762 B1 * | 9/2003 | End, III | | 341/51 |
| 6,640,145 B2 * | 10/2003 | Hoffberg et al. | | 700/83 |
| 6,661,839 B1 * | 12/2003 | Ishida et al. | | 375/240 |

(Continued)

OTHER PUBLICATIONS

"Automatic model classification of measured Internet traffic," by Yi Zeng and Thomas M. Chen, published in the 2002 IEEE Workshop on IP Operations and Management, pp. 197-201.

(Continued)

*Primary Examiner*—Ricky Ngo
*Assistant Examiner*—Dewanda Samuel
(74) *Attorney, Agent, or Firm*—Duane Morris LLP

(57) ABSTRACT

A method and system for analyzing continuous bit segments taken from a general data channel and classifying the sampled data by type, such as: voice, audio or data. B contiguous bits are converted to plus and minus deltas. The B-replaced values are then padded with B contiguous zeroes and the Fourier Transform of the padded sequence is computed. A power spectral density is derived from the Fourier Transform. In addition to the Fourier Transform, compression and entropy algorithms are performed on strings of bits within the message. The first B terms of the power spectral density and the results of the compression and entropy algorithms are used to differentiate and classify the data types, based on the premise that the combination of power spectral density, compression and entropy results yields parameters indicative of distinct types of data messages.

12 Claims, 5 Drawing Sheets

U.S. PATENT DOCUMENTS

| | | | | |
|---|---|---|---|---|
| 6,735,339 | B1* | 5/2004 | Ubale | 382/232 |
| 7,061,880 | B2* | 6/2006 | Basilier | 370/312 |
| 7,068,849 | B2* | 6/2006 | Zandi et al. | 382/240 |
| 7,170,928 | B1* | 1/2007 | Horneman et al. | 375/225 |
| 7,333,930 | B2* | 2/2008 | Baumgarte | 704/200.1 |
| 2003/0108042 | A1 | 6/2003 | Skillicorn et al. | 370/389 |
| 2004/0181393 | A1* | 9/2004 | Baumgarte | 704/200.1 |
| 2007/0014331 | A1* | 1/2007 | Eldon et al. | 375/130 |
| 2007/0014369 | A1* | 1/2007 | Santhoff et al. | 375/240.27 |
| 2007/0236488 | A1* | 10/2007 | Mathan et al. | 345/418 |

OTHER PUBLICATIONS

"Characterizing Dso-rate traffic using neural networks," by Ben P. Yuhas and Charles M. Humphries, published in the Conference Record of the 1992 Global Telecommunications Conference (GLOBECOM'92), pp. 1319-1323, vol. 3.

"Applications of SIMD Computers in Signal Processing," L. Bhuyan and D. Agrawal, National Computer Conference, AFIPS Conference Proceedings, 1982, pp. 135-142.

"The Elements of System Design", Amer Hassan, et al., Academic Press, 1994, pp. 225-226.

* cited by examiner

FIG. 1    COMMUNICATIONS SYSTEM INCORPORATING
          MEANS FOR CLASSIFYING DIGITAL TRAFFIC
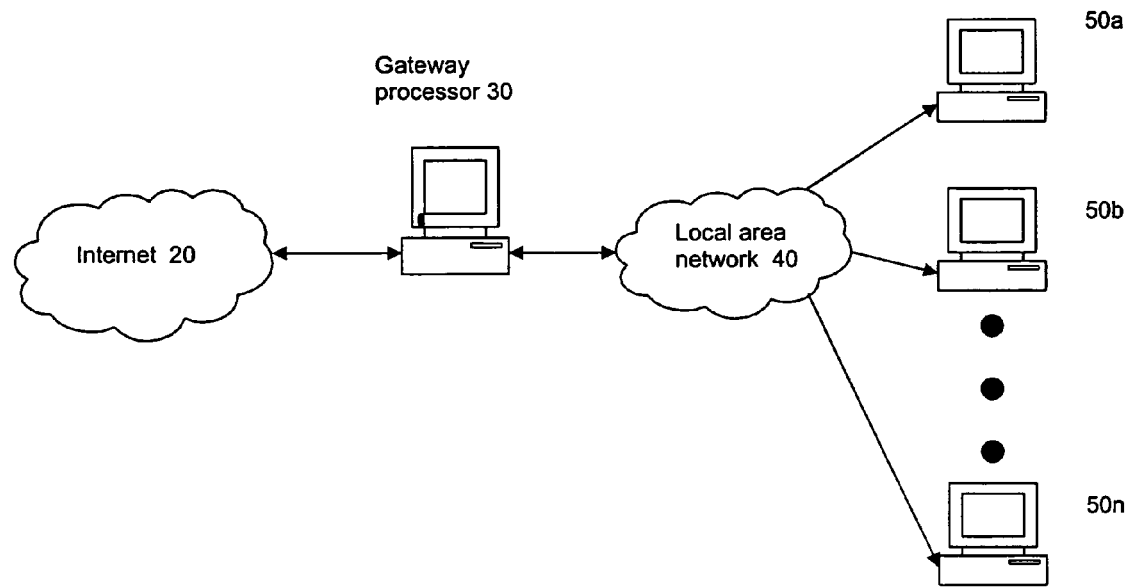
FIG. 2
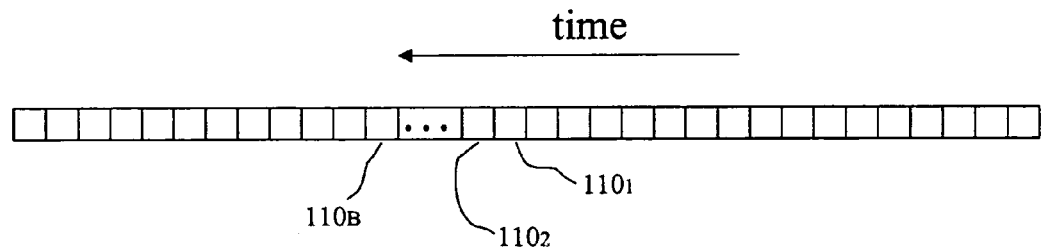

$$0\ 1\ 0\ 0 \longrightarrow 1\ -1\ 1\ 1$$

$$1\ -1\ 1\ 1 \longrightarrow 1\ -1\ 1\ 1\ 0\ 0\ 0$$

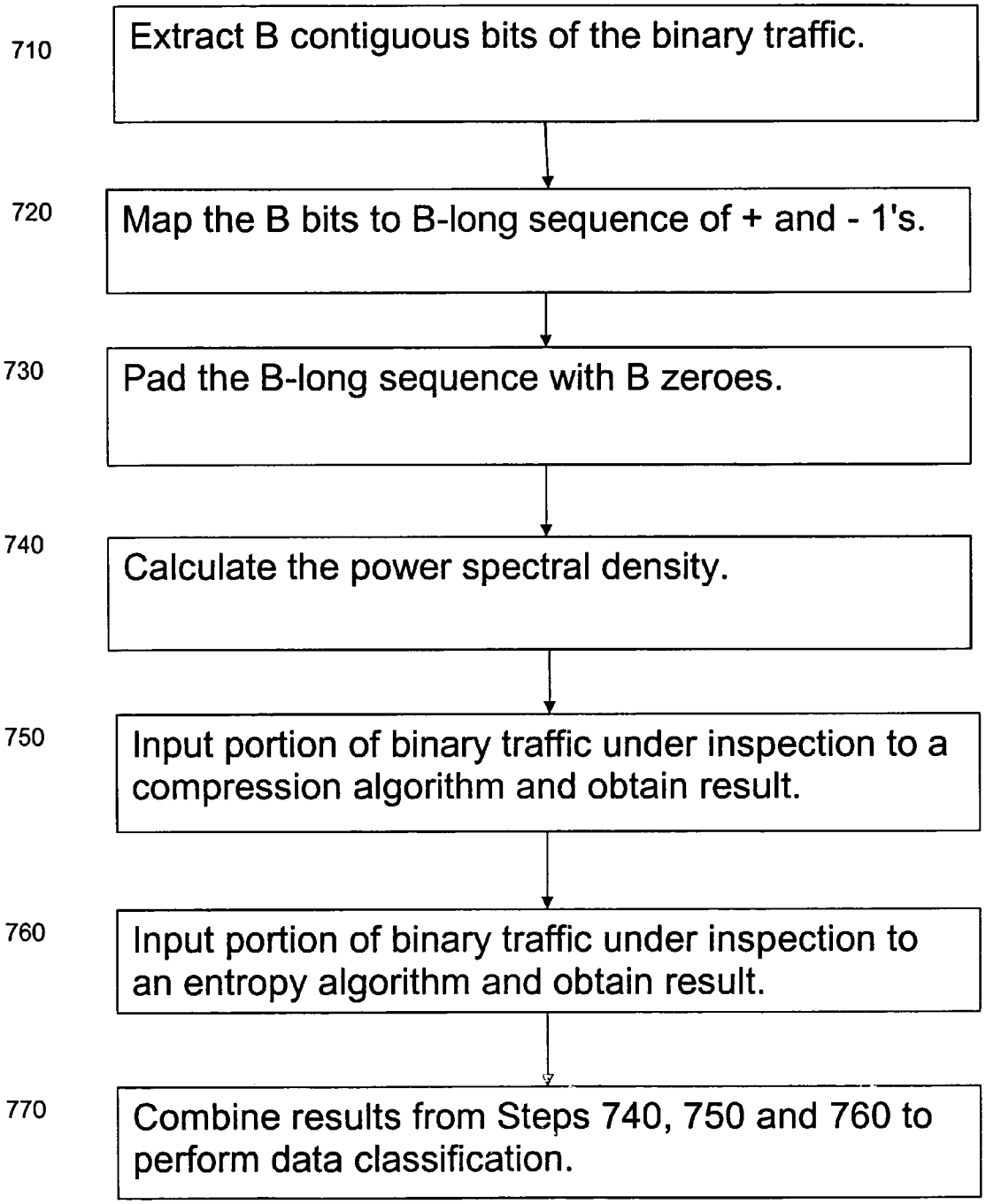

METHOD AND SYSTEM FOR CLASSIFYING DIGITAL TRAFFIC

TECHNICAL FIELD

The present invention generally relates to automated classification of packet data traffic. More specifically, the present invention is directed to a method and system for analyzing continuous bit segments taken from a general data channel and classifying the sampled digital traffic as to its type such as voice, audio, or data.

BACKGROUND

The trend in modern telecommunications is towards a common transportation architecture, one that will carry traffic from many diverse sources. As bandwidths become greater with concomitant increases in signaling and data transport rates, checking transported traffic to attempt to verify that it will not harm the network becomes an ever-increasing challenge. There is therefore a need for new methods and apparatus that can be used to screen traffic at its present and growing data rates to identify and cull those messages that present a threat to the integrity of the network.

One of the first things that must be accomplished in assessing the potential harm that a particular piece of traffic might do is to classify the traffic as to type, i.e., determine if it is voice, data, video, executable code, document, or other genre. In addition to enabling the assessment of potentially harmful messages, such data classification is also useful in prioritizing message transmission.

Effective message classification requires an efficient and accurate processing method and system capable of analyzing bit stream extracts from a data channel.

There have been numerous approaches to attempt to automatically classify digital traffic. Most of these attempts have used packet characteristics and arrival times, where, in a communications network such as the internet, portions of messages are transmitted as discrete packets and intermixed in the communications channel with packets from unrelated messages, each packet ultimately directed to its proper destination and reassembled with the other packets that form a complete message.

For example, in US Patent Application 2003/0108042, Jun. 12, 2003, "Characterizing Network Traffic from Packet Parameters," Skillicorn et al. recite a method that maps the headers of new packets into a low-dimensional memory space and compares them with a subset of headers from previously classified traffic mappings. One advantage claimed is that the classification may be carried out in the transport control protocol layer, which has the merits of speed and reduced complexity.

In U.S. Pat. No. 6,597,660, Jul. 22, 2003, "Method for Real-Time Traffic Analysis on Packet Networks," Rueda et al. disclose a method and implementing architecture for characterizing, predicting, and classifying packet network traffic using time scale analysis of packet arrival times. Packet arrival time is the only parameter used to classify traffic.

In "Automatic model classification of measured Internet traffic," by Yi Zeng and Thomas M. Chen, published in the 2002 IEEE Workshop on IP Operations and Management, pp. 197-201, the authors propose a method based on the Hurst parameter (a parameter that estimates the long range dependence of a traffic stream) that uses traffic statistics to identify one of two traffic generation modules.

One published approach that attempts to identify traffic type through analysis of the actual content of a traffic channel is found in "Characterizing DS0-rate traffic using neural networks," by Ben P. Yuhas and Charles M. Humphries, published in the Conference Record of the 1992 Global Telecommunications Conference (GLOBECOM'92), pp. 1319-1323, Vol. 3. In their approach, the authors report on their attempt to characterize traffic over a DS0 line that is a 64 kilobit/second PCM channel used in the public switched network. Their technique includes the intermediate steps of computing a short-term Hamming-windowed Fourier power spectral density from data that was formatted as multiple bit samples of pre-selected quantized voice.

While individual data analysis algorithms may be able to classify data type with an accuracy that is greater than random chance, their accuracy thus far is significantly less than practical. Hence the need exists for an approach that provides more reliable information about a data message's content while still being reasonably quick to process.

SUMMARY

According to an aspect of the invention, a method and system for characterizing packet data messages applies a plurality of data classifying algorithms. One proposed algorithm requires selecting contiguous bit segments of traffic, padding the segments to prevent wrap-around, performing a Fourier transform on the padded segments, and forming a short-term power spectral density from the Fourier transform. In addition to the Fourier transform, contiguous bit segments are also processed using compression and entropy algorithms. The results of these algorithms are combined to produce a set of parameters that provide a more reliable traffic classification than that which has been attempted in prior art methods employing only single algorithms.

According to one embodiment, the data characterization algorithms are implemented on a single computer. In another embodiment, the algorithms are implemented on a multiprocessor computer. In yet another embodiment, in a distributed processing network, the algorithms can be performed in a piecemeal fashion at a plurality of store-and-forward nodes through which the message is transported.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

FIG. 1 illustrates a typical network in which the present invention may be implemented.

FIG. 2 illustrates the selection of a contiguous sample of B bits from a traffic channel.

FIG. 8 illustrates an exemplary process flow according to an embodiment of the present invention.

DETAILED DESCRIPTION

Figures 3, 4, 5:
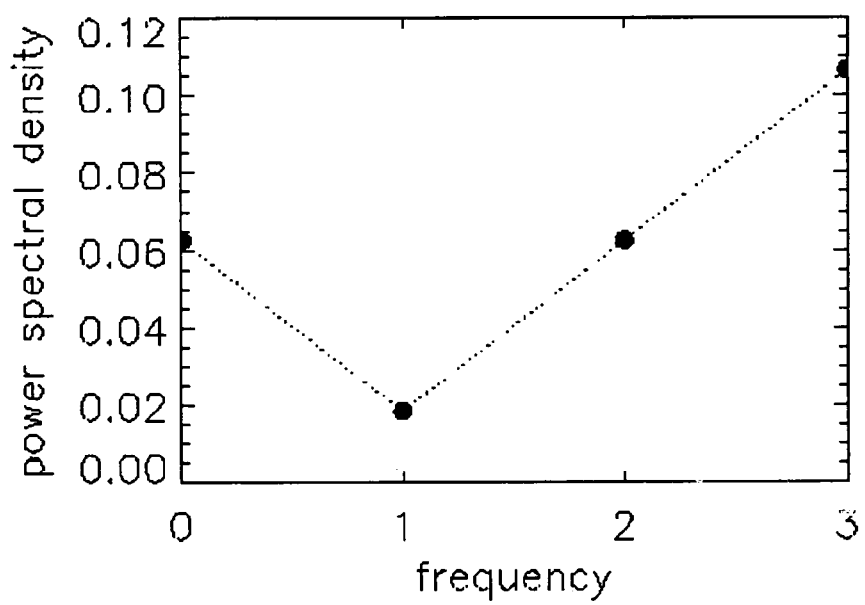
FIG. 3 illustrates the conversion of B=4 contiguous bits into ones and minus ones.
FIG. 4 illustrates the padding of the B=4 sequence of FIG. 2 to create a 2B=8 bit long sequence.
FIG. 5 illustrates the plot of the first B=4 terms of the power spectral density of the 2B=8 bit long sequence displayed in FIG. 3.

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

The invention is directed to a general binary traffic classifier. For this reason the invention is designed to operate without regard to data format, wherein the traffic is sampled in contiguous bits and where a contiguous bit sample is extracted from Within the data or message portion of an individual message.

FIG. 1 illustrates one example of a system 10 in which the present invention may be implemented. Gateway processor 30 allows the stations (50a-50n) of a local area network 40 to communicate with an external network such as the internet, 20. In such a system, communications between the stations and with the internet may be by a packet-based protocol, such as the Internet Protocol. Internet packets include a payload portion containing actual data and a header portion providing information about the data, such as its source and destination. As depicted, all packets pass through the Gateway Processor.

In this system, the gateway processor can act, for instance, as a filter or trap for harmful message packets that originate in the outside network, thus preventing the messages from corrupting data or disturbing communications within the local area network. In one embodiment, the present method may be implemented as an algorithm in the Gateway Processor, which acts as a transceiver for all traffic between the internet and the local area network. By classifying data as described herein, the gateway processor can make determinations and take actions, such as preventing message transmission or examining a particular message more closely depending upon an initial determination of the message type. Another use of the message type information which is developed as described herein, would be a readjustment of message transmission priority.

According to an embodiment of the present invention, several data characterizing algorithms are implemented and the results are then combined to form a more accurate characterization of data type. As explained in greater detail below, one of the data characterization algorithms involves the calculation of the power spectral density of a number of contiguous bits of a message under examination.

FIG. 2 illustrates the selection of B-contiguous bits $110_1$, $110_2$, ..., $110_B$, from a message bit stream 100. In a very simplified example, for illustration, only 4 contiguous bits are selected, i.e. B=4. In the computation of the power spectral density, the B-contiguous bits are first converted to plus and minus deltas by an invariant convention. In one example, delta is chosen to be 1, and the invariant convention is chosen such that a zero is replaced by a one and a one is replaced by a minus one, i.e., if a particular bit, B, of the B-contiguous bits is one of the two cases, b=0 or b=1, the bit is replaced by the value b' where b'=1−2b.

This step is illustrated in FIG. 3 where B=4 contiguous bits, 0, 1, 0, 0 are replaced by 1, −1, 1, 1.

The 4 replaced values are then padded with 4 contiguous zeros. This step is illustrated in FIG. 4 where the B=4 replaced bits, 1, −1, 1, 1 are right-padded with B=4 zeros to form the padded sequence 1, −1, 1, 1, 0, 0, 0, 0.

The Fourier Transform of the padded sequence is then computed. The Fourier Transform of the padded sequence 1, −1, 1, 1, 0, 0, 0, 0 is proportional to the complex vector 0.25, −0.0518−125j, 0.25j, 0.302+0.125j, 0.25, 0.302−0.125j, −0.25j, −0.0518+0.125j. The Fourier Transform is then multiplied by its complex conjugate to form the power spectral density, the components of which are real valued. The first B terms of the power spectral density are then extracted. In the example given, the first 4 terms are 0.0625, 0.0183, 0.0625, 0.107. The first B=4 terms of this example are plotted on the graph in FIG. 5.

While B=4 bits were chosen as to illustrate the computational steps, in more practical embodiments, B would range from 2000 to 16,000 or more bits. It will be recognized that a larger number of samples will result in more sharply defined spectral peaks, while lower numbers of sampled bits will require less execution time, but produce wider, less sharp spectral peaks. B can be selected to optimize performance considering given processing capability, time constraints and desired accuracy of results.

The Fourier Transform may be calculated by a variety of means, including the Fast Fourier Transform (FFT) method that is well known in the art. It is possible to further increase the speed of processing by performing the FFT on a multi-processor architecture such as that described in "Applications of SIMD Computers in Signal Processing," L. Bhuyan and D. Agrawal, National Computer Conference, AFIPS Conference Proceedings, 1982, pp. 135-142 and further discussed in *The Elements of System Design*, Amer Hassan et al., Academic Press, 1994, pp. 225-226.

Figure 6:
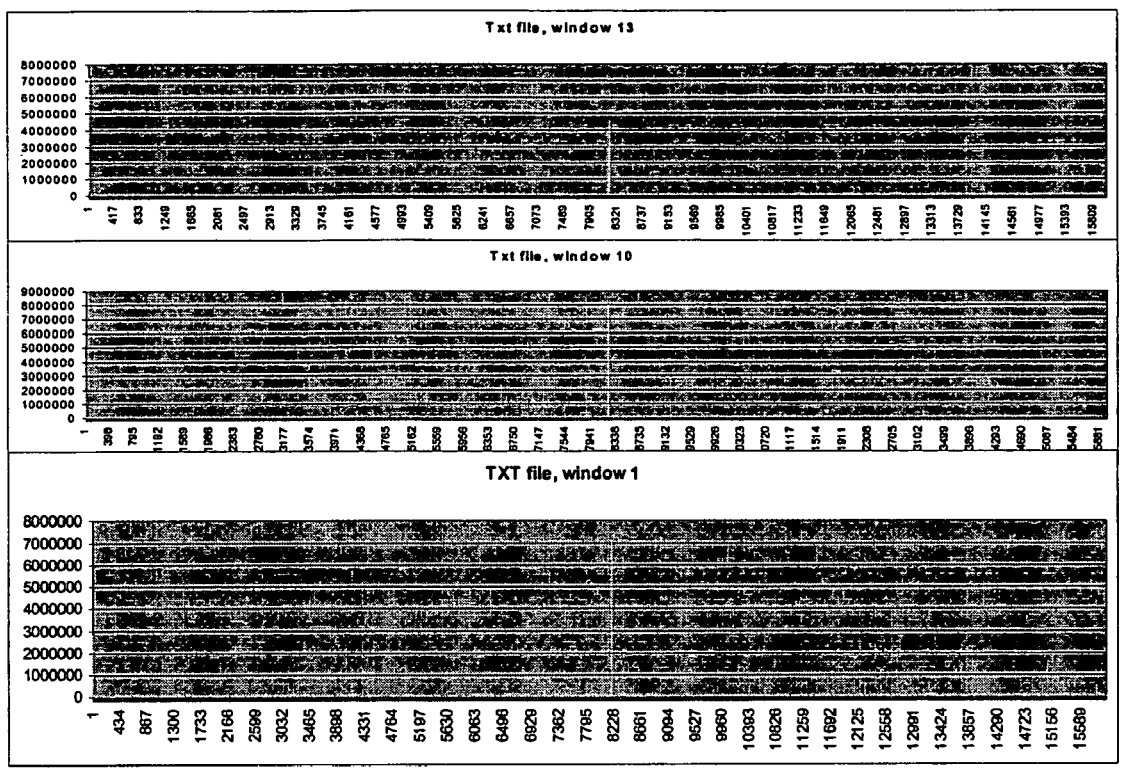
FIG. 6 illustrates the first 16,384 terms of the power spectral density of three B=16,384 contiguous bit extracts of a text message.
Figure 7:
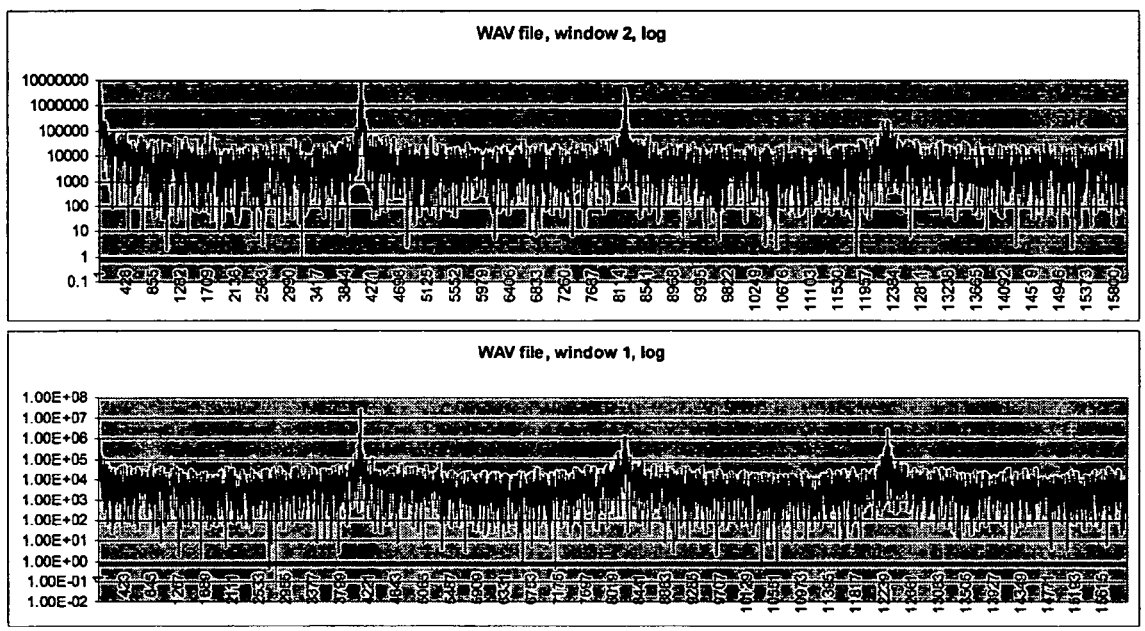
FIG. 7 illustrates the first 16,384 terms of the power spectral density of two B=16,384 contiguous bit extracts of an audio file message.

FIG. 6 displays plots of the power spectral density for three B=16,384 samples from a text message and FIG. 7 displays plots of the power spectral density for two B=16,384 samples from an audio file message. These two figures show the distinctly different spectra for the two different data types and the usefulness of employing spectral information as one parameter in a method of characterizing data types. In FIG. 6, a text message produced very narrow frequency peaks in the power spectral density graphs, while in FIG. 6 a sample of an audio file message produced broad frequency peaks in the power spectral density graph.

In addition to the power spectral density, algorithms based on compression techniques and on data entropy are computed to provide additional parameters with which to classify the data message. Compression techniques such as Lempel-Zev and the various ZIP algorithms may be used. Degree of compression is the factor that is sought as a parameter in the classification technique.

The results of the power spectral density, compression and entropy calculations are analyzed based on prior characterizations of known data types. The results will exhibit features indicative of well-known data types that can be recognized and used to estimate traffic type. The recognition may be performed automatically by classification techniques that are well known in the art such as neural networks and clustering methods.

The method of combination of the results of power spectral density, compression and entropy calculations requires that patterns of prediction be detected for each prediction algorithm by first inputting data streams of known types. Then a coordination function is employed to exploit the combined patterns of prediction to assert the most likely data type for the file being examined. The coordination function may also be tuned manually or automatically to suit the particular environment in which it is to be deployed and the classification problem to be solved. For instance, different calculations might be required if the task is to separate audio traffic from video traffic than if the goal is to separate audio and video traffic from all other types of network communication.

One example of a coordination function can be based on probabilities. For example certain data types tested produced results in some of the characterization algorithms that had a higher probability of falling into some data ranges or bands but not others. By plotting the output data range probabilities for each of the algorithms for a known type of input data stream, a table or map can be established for that type of data. For example, if one employs four different characterization algorithms and divides the possible result range for each into four discrete bands, a map can be created for the relative probabilities of a known data stream producing results in each of the 256 possible data bands. By using test data of a known type to classify the probabilities of outputs occurring in the possible data bands, the algorithm results of unknown data types can then be compared with each of the maps for known data types for correlation.

Another possible coordination function would use statistical regression with test data to form a polynomial which would predict the input data type from the output values of each of the classification algorithms. In this method, two or more sets of classification results are graphed against the input data type for a test set, and a curve is constructed to fit the data. If a representative curve is found, then the equation of that curve is used to classify new data.

FIG. 8 illustrates an exemplary process flow according to the method disclosed herein. The method is started in Step 700 that specifies the selection of B-contiguous bits of the binary traffic. Control then passes to Step 720 that specifies the mapping of the extracted B contiguous bits to a B-long sequence of plus and minus ones. Control then passes to Step 730 that specifies the padding of the B-long sequence with B zeros. Control then passes to Step 740 that specifies the calculation of the power spectral density of the padded sequence, the power spectral density being one of a plurality of data classifying parameters. At step 750, a number of contiguous bits, which may or may not be the same as B are processed by a compression algorithm to produce another data classification parameter related to the compression factor for the sequence of bits. At Step 760, a number of contiguous bits, which may or may not be the same bits employed in steps 700 through 760, are processed by an entropy algorithm to produce yet a third data classifying parameter.

At Step 770 the results of Steps 700 through 760, i.e., the power spectral density, the compression factor and entropy calculation are entered into a classification algorithm that analyzes the result patterns based on previously characterized patterns for known data types. A neural network may be employed to perform the characterization and part of that process may be to first "train" the network with known message types.

In another embodiment, instead of the Fourier Transform performed at Steps 710 to 740, the Wavelet Transform using any mother wavelet is computed and the wavelet decomposition used to drive classification of sequence as above. This transform technique often has the advantage of providing more information about a signal that varies over time versus the Fourier transform, which is generally more useful in analyzing repetitive signals.

In accordance with another aspect, the subject invention resides in the program storage medium that constrains operation of the associated processors(s), and in the method steps that are undertaken by cooperative operation of the processor (s) on the messages within the communications network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download. The same is true of computer networks in general.

In the form of processes and apparatus implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for classification of binary traffic comprising the steps of:
   calculating, with a processor, a power spectral density on a first subset of contiguous bits of a plurality of bits of binary traffic of an unknown data type;
   performing, with a processor, a compression algorithm on a second subset of contiguous bits of said plurality of bits of the binary traffic and producing a compression result;
   performing, with a processor, an entropy algorithm on a third subset of contiguous bits of said plurality of bits of the binary traffic and producing an entropy result;
   performing a data classification algorithm on said power spectral density with a processor, said compression result and said entropy result to identify the unknown data type of the binary traffic.

2. A method for classification of binary traffic, said method comprising the steps of:
- calculating, with a processor, a power spectral density on a first subset of contiguous bits of a plurality of bits of binary traffic;
- performing, with a processor, a compression algorithm on a second subset of contiguous bits of said plurality of bits of the binary traffic and producing a compression result;
- performing, with a processor, an entropy algorithm on a third subset of contiguous bits of said plurality of bits of the binary traffic and producing an entropy result;
- performing, with a processor, a data classification algorithm on said power spectral density, said compression result and said entropy result to produce a data classification result wherein said power spectral density is calculated by:
- mapping, with a processor, B-bits of said plurality of bits of binary traffic to a B-long sequence of deltas and minus deltas;
- padding, with a processor, the B-long sequence with B zeroes to produce a 2B-long padded sequence; and
- calculating, with a processor, a power spectral density of the padded sequence.

3. The method of claim 2 wherein said power spectral density is calculated by a Fast Fourier Transform.

4. The method of claim 2 where said delta equals one and said minus delta equals minus one.

5. The method of claim 2 wherein B is a power of 2.

6. The method of claim 2, wherein said power spectral density is calculated by a wavelet algorithm.

7. The method of claim 2, wherein said compression algorithm is one of a group of Limpel-Zev, ZIP, BZIP and GZIP data compression algorithms.

8. The method of claim 2, wherein the data classification algorithm is a neural network.

9. The method of claim 2, comprising the further steps of:
- analyzing a plurality of samples of said binary traffic with known data types according to the steps of claim 1;
- combining said power spectral density, compression result and entropy result for each of said samples of binary traffic with known data types in a training algorithm; and
- adjusting said data classification algorithm according to the results of said training algorithm.

10. A system for classification of binary data traffic comprising:
- means for receiving binary data traffic of an unknown data type;
- means for recognizing a discrete packet of data received from said binary data traffic;
- means for storing a plurality of contiguous data bits of said discrete packet;
- processing means for performing a power spectrum density algorithm, a compression algorithm and an entropy algorithm on said contiguous data bits, and for producing a power spectrum density result, a compression factor result and a data entropy result;
- said processing means being further capable of performing a data classification algorithm on said power spectrum density result, said compression factor result and said data entropy result to identify the unknown data type of the binary data traffic.

11. The system of claim 10 wherein said processing means are further capable of receiving data classification information about said binary data traffic and wherein said processing means are capable of adjusting said data classification algorithm based on said data classification result and said received data classification information.

12. A computer readable storage medium for controlling operation of a processor capable of reading a stream of binary traffic, the computer readable storage medium comprising:
- code for calculating a power spectral density on a first subset of contiguous bits of a plurality of bits of the binary traffic of an unknown data type;
- code for performing a compression algorithm on a second subset of contiguous bits of said plurality of bits of the binary traffic and producing a compression result;
- code for performing an entropy algorithm on a third subset of contiguous bits of said plurality of bits of the binary traffic and producing an entropy result; and
- code for performing a data classification algorithm on said power spectral density, said compression result and said entropy result to identify the unknown data type of the binary traffic.

* * * * *